United States Patent
Onozawa et al.

(10) Patent No.: US 9,672,739 B2
(45) Date of Patent: Jun. 6, 2017

(54) MAP DATA UPDATE DEVICE

(71) Applicants: C's Lab Co., Ltd., Sapporo, Hokkaido (JP); Alpine Electronics, Inc., Tokyo (JP); Honda Motor Co., Ltd., Minato-ku, Tokyo (JP)

(72) Inventors: Toshiaki Onozawa, Sapporo (JP); Yoshimi Satou, Sapporo (JP); Yuuko Kimura, Sapporo (JP); Akihisa Baba, Iwaki (JP); Shinichi Tomiyama, Tokyo (JP)

(73) Assignees: Alpine Electronics, Inc., Tokyo (JP); C's Lab Co., Ltd., Hokkaido (JP); Honda Motor Co., Ltd., Tokyo (JP)

(*) Notice: Subject to any disclaimer, the term of this patent is extended or adjusted under 35 U.S.C. 154(b) by 0 days.

(21) Appl. No.: 15/187,413

(22) Filed: Jun. 20, 2016

(65) Prior Publication Data
US 2016/0307445 A1    Oct. 20, 2016

Related U.S. Application Data

(63) Continuation of application No. PCT/JP2014/078850, filed on Oct. 30, 2014.

(30) Foreign Application Priority Data

Dec. 27, 2013 (JP) ................. 2013-271888

(51) Int. Cl.
*G01C 21/26* (2006.01)
*G01C 21/34* (2006.01)
(Continued)

(52) U.S. Cl.
CPC ....... *G08G 1/096844* (2013.01); *G01C 21/26* (2013.01); *G01C 21/30* (2013.01);
(Continued)

(58) Field of Classification Search
USPC ... 701/411, 450, 521–522, 413, 468, 417, 4; 340/995.18, 995.19, 995.22
See application file for complete search history.

(56) References Cited

U.S. PATENT DOCUMENTS 5,802,492 A * 9/1998 DeLorme ........... G01C 21/3476
340/990
6,263,276 B1 * 7/2001 Yokoyama ............. G01C 21/26
340/988

(Continued)

FOREIGN PATENT DOCUMENTS

DE    69628274 E  *  6/2003  ............. G01C 21/34
EP    782118 B1  *  5/2003  ............ G01C 21/026
(Continued)

OTHER PUBLICATIONS

Translation version of JP 2012-002782 A from this Japanese reference submitted in IDS Jun. 20, 2016.*
(Continued)

*Primary Examiner* — Cuong H Nguyen
(74) *Attorney, Agent, or Firm* — Brinks Gilson & Lione

(57) ABSTRACT

For a new road set in a region where an existing road is not present in map data, a road associated information setting unit 13 determines and sets road associated information to be applied to a road link of a new road on the basis of movement history data relating to a plurality of moving bodies stored in a movement history storage unit 14. Accordingly, the road associated information on the new road is automatically set on the basis of the movement history data relating to the plurality of moving bodies, and hence a worker is no longer required to execute on-site investigation or manually generate road associated information.

8 Claims, 3 Drawing Sheets

|  | CONNECTION-TARGET EXISTING ROAD | | |
|---|---|---|---|
|  | EXPRESSWAY | RAMP ROAD | LOCAL ROAD |
| CONNECTION-SOURCE EXISTING ROAD — EXPRESSWAY | EXPRESSWAY/ RAMP ROAD | RAMP ROAD | RAMP ROAD |
| CONNECTION-SOURCE EXISTING ROAD — RAMP ROAD | RAMP ROAD | RAMP ROAD | RAMP ROAD | RAMP ROAD/ LOCAL ROAD |
| CONNECTION-SOURCE EXISTING ROAD — LOCAL ROAD | LOCAL ROAD | RAMP ROAD | RAMP ROAD/ LOCAL ROAD | LOCAL ROAD |

(51) Int. Cl.
| | |
|---|---|
| *G08G 1/0968* | (2006.01) |
| *G08G 1/01* | (2006.01) |
| *G08G 1/0967* | (2006.01) |
| *G09B 29/00* | (2006.01) |
| *G01C 21/32* | (2006.01) |
| *G01C 21/30* | (2006.01) |
| *G08G 1/13* | (2006.01) |
| *H04L 29/08* | (2006.01) |

(52) U.S. Cl.
CPC ............. *G01C 21/32* (2013.01); *G01C 21/34* (2013.01); *G08G 1/0112* (2013.01); *G08G 1/0129* (2013.01); *G08G 1/0141* (2013.01); *G08G 1/096775* (2013.01); *G08G 1/13* (2013.01); *G09B 29/006* (2013.01); *H04L 67/12* (2013.01); *H04L 67/18* (2013.01)

(56) References Cited

U.S. PATENT DOCUMENTS

| | | | | |
|---|---|---|---|---|
| 6,321,158 | B1* | 11/2001 | DeLorme | G01C 21/26 340/995.16 |
| 7,379,812 | B2* | 5/2008 | Yoshioka | G01C 21/32 340/995.19 |
| 7,480,565 | B2* | 1/2009 | Ikeuchi | G01C 21/32 340/995.1 |
| 2003/0182052 | A1* | 9/2003 | DeLorme | G01C 21/26 701/533 |
| 2006/0122846 | A1* | 6/2006 | Burr | G01C 21/3492 342/357.31 |
| 2007/0208497 | A1* | 9/2007 | Downs | G08G 1/0104 701/117 |
| 2009/0138497 | A1 | 5/2009 | Zavoli et al. | |
| 2010/0179755 | A1* | 7/2010 | Kohno | G01C 21/32 701/532 |
| 2010/0228471 | A1* | 9/2010 | Nagase | G01C 21/3492 701/532 |
| 2011/0004397 | A1* | 1/2011 | Nagase | G08G 1/01 701/119 |
| 2011/0015851 | A1* | 1/2011 | Burr | G01C 21/3492 701/117 |
| 2011/0112747 | A1* | 5/2011 | Downs | G08G 1/0104 701/118 |
| 2012/0173530 | A1 | 7/2012 | Kurciska et al. | |

FOREIGN PATENT DOCUMENTS

| | | | |
|---|---|---|---|
| JP | 3496487 | 6/1999 | |
| JP | 3512073 B2 * | 3/2004 | ............ G01C 21/00 |
| JP | 2008-076090 | 4/2008 | |
| JP | 2010-286258 | 12/2010 | |
| JP | 2012002782 | 1/2012 | |
| JP | 4887468 | 2/2012 | |

OTHER PUBLICATIONS

An English-language version of JP 2012-002782 A from this Japanese reference submitted in IDS Jun. 20, 2016.*

HD Maps: Fine-Grained Road Segmentation by Parsing Ground and Aerial Images; Gellért Máttyus; Shenlong Wang; Sanja Fidler; Raquel Urtasun; 2016 IEEE Conference on Computer Vision and Pattern Recognition (CVPR); Year: 2016; pp. 3611-3619, DOI: 10.1109/CVPR.2016.393.*

Variable-sensitivity road departure warning system based on static, mapped, near-road threats; Prashant Arora; David Corbin; Sean N. Brennan; 2016 IEEE Intelligent Vehicles Symposium (IV); Year: 2016; pp. 1217-1223, DOI: 10.1109/IVS.2016.7535545.*

Predictive tree: An efficient index for predictive queries on road networks;Abdeltawab M. Hendawi; Jie Bao; Mohamed F. Mokbel; Mohamed Ali; 2015 IEEE 31st International Conference on Data Engineering; Year: 2015; pp. 1215-1226, DOI: 10.1109/ICDE.2015.7113369.*

LaneSLAM—Simultaneous Pose and Lane Estimation Using Maps with Lane-Level Accuracy; Toni Heidenreich; Jens Spehr; Christoph Stiller; 2015 IEEE 18th International Conference on Intelligent Transportation Systems; Year: 2015; pp. 2512-2517, DOI: 10.1109/ITSC.2015.404.*

International Search Report and Written Opinion for PCT for PCT/JP2014/078850, dated Dec. 22, 2014, 9 pages.

* cited by examiner

|  | CONNECTION-TARGET EXISTING ROAD | | |
|---|---|---|---|
|  | EXPRESSWAY | RAMP ROAD | LOCAL ROAD |
| CONNECTION-SOURCE EXISTING ROAD — EXPRESSWAY | EXPRESSWAY/ RAMP ROAD | RAMP ROAD | RAMP ROAD |
| CONNECTION-SOURCE EXISTING ROAD — RAMP ROAD | RAMP ROAD | RAMP ROAD | RAMP ROAD/ LOCAL ROAD |
| CONNECTION-SOURCE EXISTING ROAD — LOCAL ROAD | RAMP ROAD | RAMP ROAD/ LOCAL ROAD | LOCAL ROAD |

MAP DATA UPDATE DEVICE

RELATED APPLICATIONS

The present application is a continuation of PCT Appln. No. PCT/JP2014/078850, filed Oct. 30, 2014, which claims priority to Japanese Patent Application Serial Number 2013-271888, filed Dec. 27, 2013, the entirety of each of which is hereby incorporated by reference.

BACKGROUND

1. Field of the Invention

The present invention relates to a map data update device that updates map data on the basis of movement history data of a moving body.

2. Background Art

In general, a navigation apparatus uses map data for executing processing of route search and route guidance. This map data is generated to reflect an actual road. Hence, if a new road is constructed, it is desirable to generate a corresponding new road and register the new road in the map data.

Map data typically includes information relating to a node corresponding to a point at which a plurality of roads intersect with each other, such as an intersection or a branch; and information relating to a road link corresponding to a road, a lane, etc. The information relating to the road link includes information on a road type and information on a road attribute. The information on the road type indicates a type, for example, whether the actual road corresponding to the road link is an expressway or a local road. The information on the road attribute indicates various attributes (the number of lanes, road width, traffic regulation, etc.) relating to the road link.

Hence, when a new road is generated in the map data, it is required to generate respective pieces of information on the node and road link in accordance with the road shape, and to generate the road type and road attribute as information associated with the road link. To address this, there has been suggested a technology that automatically generates a new road on the basis of a traveling locus in a section in which an existing road is not present in map data (for example, see Japanese Unexamined Patent Application Publication No. 2010-286258 ("PTL 1") and Japanese Patent No. 4887468 ("PTL 2")).

PTL 1 describes that a traveling locus from separation from an existing road on map data until return to another existing road is automatically added as a new road to the map data. Also, PTL 1 describes that, if an expressway and a local road exist vertically in parallel as existing roads at the return point, the average speed in traveling on a new road is compared with the average speed in traveling on an existing road, to determine with which existing road the new road is connected.

PTL 2 describes that an on-road section corresponding to a road existing on map data and an off-road section corresponding to a road not existing on the map data are determined on the basis of traveling loci and the map data, and a new road is generated on the basis of a traveling locus in the determined off-road section. Also, PTL 2 describes that, if an on-road section is sandwiched between two off-road sections, a single new road is generated by integrating the two off-road sections and the on-road section.

Also, there has been suggested a technology that compares a road link in map data on which a vehicle currently travels, with a previously specified link, judges whether the vehicle is branched from or merged to a trunk road having a predetermined scale or larger, and stores a road link series which changes from the branch to merge, as a traveling locus (for example, see Japanese Patent No. 3496487).

SUMMARY

With the technologies described in PTL 1 and PTL 2, the new road can be automatically generated on the basis of the traveling locus. However, although the road link can be automatically generated, road associated information such as the road type or road attribute cannot be automatically generated. Because of this, a worker manually generates the road associated information. In particular, to obtain the road associated information, the worker has to visit the site where the road was actually constructed and perform on-site inspection. This is a troublesome work. Also, it takes a long period of time until the new road is registered in the map data.

The present invention is made to address such problems, and it is an object of the invention to markedly decrease the troublesome work and time required for registration of a new road by allowing road associated information relating to the new road to be automatically registered in map data.

To address the above-described problem, in implementations of the present invention, for a new road set in a region where an existing road is not present on map data, road associated information to be applied to a road link of a new road is determined and set on the basis of movement history data relating to at least one moving body stored in a movement history storage unit.

With the form configured as described above, since the road associated information on the new road is automatically set on the basis of the movement history data relating to the plurality of moving bodies, the worker is no longer required to perform the on-site investigation or to manually generate the road associated information. Accordingly, the troublesome work and time required for the registration of the new road can be markedly decreased.

DETAILED DESCRIPTION OF THE DRAWINGS

Figure 1:
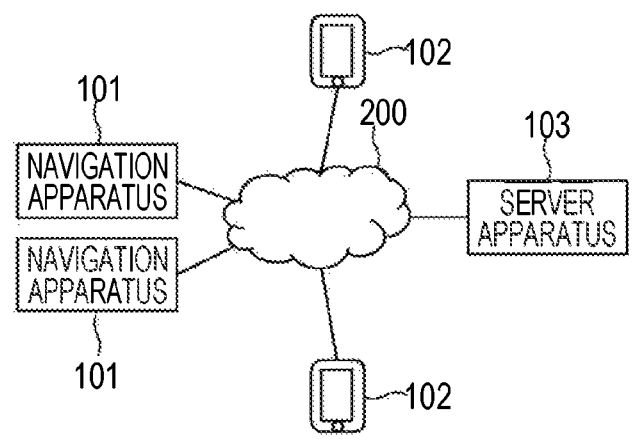
FIG. 1 is an illustration showing a configuration example of a navigation system including a map data update device.

An embodiment of the invention is described below with reference to the drawings. FIG. 1 is an illustration showing a configuration example of a navigation system including a map data update device.

As shown in FIG. 1, the navigation system includes a navigation apparatus 101 mounted on a vehicle, a smart phone 102 carried by a person as an occupant of a vehicle or a pedestrian and having a navigation function, and a server apparatus 103. The navigation apparatus 101 and the smart phone 102 are connected with the server apparatus 103 through the Internet 200.

The navigation apparatus 101 can download and use the latest map data from the server apparatus 103. The navigation apparatus 101 has a function of generating movement history data on the basis of the map data downloaded from the server apparatus 103 and position determination information by an autonomous navigation sensor or a GPS receiver. The movement history data in this case includes data, such as a traveling locus, a traveling speed, and a traveling time of the vehicle on the map data. The navigation apparatus 101 transmits the generated movement history data to the server apparatus 103.

The smart phone 102 can also download and use the latest map data from the server apparatus 103. The smart phone 102 has a function of generating movement history data on the basis of the map data downloaded from the server apparatus 103 and position determination information by a GPS receiver. The movement history data in this case includes data, such as a moving locus, a moving speed, and a moving time of a person (an occupant or a pedestrian) on the map data. The smart phone 102 transmits the generated movement history data to the server apparatus 103.

The server apparatus 103 includes a map data update device. The map data update device collects movement history data of moving bodies (vehicles and persons) from a plurality of navigation apparatuses 101 and a plurality of smart phones 102. Then, the map data update device updates map data on the basis of the collected movement history data. To be specific, the map data update device generates data relating to roads newly constructed at various locations and registers the new roads in the map data. Data generated in this case is road links of the new roads and various road associated information to be applied to the road links.

Figure 2:
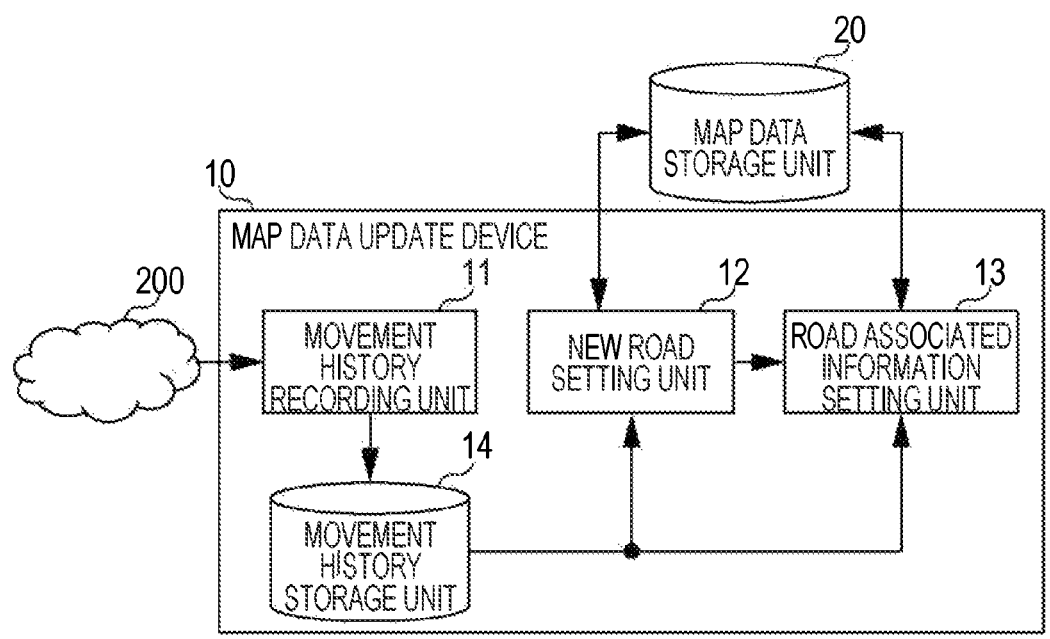
FIG. 2 is a block diagram showing a functional configuration example of the map data update device.

FIG. 2 is a block diagram showing a functional configuration example of a map data update device 10 included in the server apparatus 103. As shown in FIG. 2, the map data update device 10 includes, as its functional configurations, a movement history recording unit 11, a new road setting unit 12, a road associated information setting unit 13, and a movement history storage unit 14. The map data update device 10 updates map data stored in a map data storage unit 20 on the basis of the movement history data collected from the plurality of navigation apparatuses 101 and the plurality of smart phones 102 through the Internet 200.

The movement history recording unit 11 causes the movement history data relating to the plurality of moving bodies transmitted from the plurality of navigation apparatuses 101 and the plurality of smart phones 102 through the Internet 200 to be stored in the movement history storage unit 14.

The new road setting unit 12 sets a new road on the map data, on the basis of a moving locus in a region where an existing road is not present on the map data stored in the map data storage unit 20, among moving loci of moving bodies indicated by the movement history data stored in the movement history storage unit 14. To be specific, the new road setting unit 12 sets a road link of a new road along a moving locus.

The road link may be automatically set by a computer similarly to PTL 1 and PTL 2. Alternatively, the moving locus may be displayed on a display screen of the server apparatus 103, and an operator may set the road link on the basis of information manually input by operating an input device along the displayed moving locus.

The road associated information setting unit 13 determines road associated information to be applied to the road link of the new road and sets the road associated information on the map data, on the basis of the movement history data stored in the movement history storage unit 14 for the new road set by the new road setting unit 12. For example, the road associated information setting unit 13 determines and sets the road type (one of an expressway, a ramp road, and a local road) of the new road as a piece of the road associated information.

To be specific, the road associated information setting unit 13 specifies a connection-source existing road and a connection-target existing road connected with the new road at both ends of the new road. Then, the road associated information setting unit 13 determines and sets the road type of the new road on the basis of the road types set on the map data for the respective specified existing roads and the traveling speeds of a plurality of vehicles indicated in the movement history data.

Figures 3, 4:
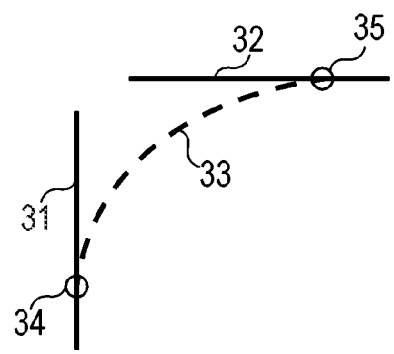
FIG. 3 is an illustration for describing an operation example when a road associated information setting unit sets a road type.
FIG. 4 is an illustration for describing a predetermined rule when the road associated information setting unit sets the road type.

FIG. 3 is an illustration for describing an operation example of the above-described road associated information setting unit 13. In FIG. 3, reference signs 31 and 32 denote existing roads. The road links and road associated information relating to the existing roads 31 and 32 have been already stored in the map data storage unit 20. In contrast, reference sign 33 denotes a new road set by the new road setting unit 12, and it is assumed that the road link of the new road has been newly registered in the map data storage unit 20.

In this case, the road associated information setting unit 13 specifies the connection-source existing road 31 and the connection-target existing road 32 connected with the new road 33 at both ends 34 and 35 of the new road 33. The connection source and the connection target may be arbitrarily specified respectively for both the ends 34 and 35 of the new road 33. To strictly specify the connection source and the connection target, for example, one at an early traveling time of the ends 34 and 35 may be specified as the connection source and the other at a late traveling time may be specified as the connection target on the basis of the traveling locus stored in the movement history storage unit 14 and data of traveling times of both the ends 34 and 35 on the traveling locus.

Further, the road associated information setting unit 13 determines and sets the road type of the new road under a predetermined rule, on the basis of the road types set on the map data of the map data storage unit 20 for the existing roads 31 and 32 specified as described above, and an average traveling speed calculated from the traveling speeds of the plurality of vehicles stored in the movement history storage unit 14, as the movement history data relating to the new road 33. In this embodiment, the entire section of the new road 33 is divided into a plurality of small sections, and the average traveling speed is calculated for each small section.

FIG. 4 is an illustration for describing a predetermined rule. FIG. 4 shows a matrix for specifying the road type of the new road from combinations of three road types of the connection-source existing road 31 and three road types of the connection-target existing road 32. For example, if the road type of the connection-source existing road 31 is an expressway and the road type of the connection-target existing road 32 is a ramp road, the road associated information setting unit 13 determines the road type of the new road 33 as a ramp road.

Also, if the road type of the connection-source existing road 31 is an expressway and the road type of the connection-target existing road 32 is also an expressway, the road type of the new road 33 is one of an expressway and a ramp road. In this case, the road associated information setting unit 13 determines the road type of the new road 33 on the basis of the average traveling speed of the plurality of vehicles. To be specific, if the length of a section in which the average traveling speed is X1 [km/h] (for example, 70 km/h) or higher is Y1% (for example, 80%) or higher of the length of the entire section of the new road 33, the road associated information setting unit 13 determines the new road 33 as an expressway. In contrast, if this condition is not satisfied, the road associated information setting unit 13 determines the new road 33 as a ramp road.

If the road type of the connection-source existing road 31 is a ramp road and the road type of the connection-target existing road 32 is a local road, and if the road type of the connection-source existing road 31 is a local road and the road type of the connection-target existing road 32 is a ramp road, the road type of the new road 33 is one of a ramp road and a local road. In this case, the road associated information setting unit 13 determines the road type of the new road 33 on the basis of the average traveling speed of the plurality of vehicles. To be specific, if the length of a section in which the average traveling speed is X2 [km/h] (for example, 60 km/h) or higher is Y2% (for example, 70%) or higher of the length of the entire section of the new road 33, the new road 33 is determined as a ramp road. In contrast, if this condition is not satisfied, the new road 33 is determined as a local road.

The road associated information setting unit 13 may further set tollgate information being a road attribute of the new road, as a piece of the road associated information. For example, the road associated information setting unit 13 determines whether or not a point is present at which traveling of a vehicle stops for several seconds, on the basis of the traveling locus stored in the movement history storage unit 14 and data of traveling times at respective points on the locus, for the new road determined as an expressway or a ramp road. Then, if such a stop point is present, the road associated information setting unit 13 sets the tollgate information for the road link including the stop point. This tollgate information can be set as long as data of at least one traveling locus is present.

Also, the road associated information setting unit 13 determines and sets the number of lanes being a road attribute of the new road, as a piece of the road associated information. To be specific, the road associated information setting unit 13 specifies traveling loci being the farthest from a road shape line generated for the new road, at both sides of the road shape line, among a plurality of traveling loci indicated by the movement history data relating to the new road. Then, the road associated information setting unit 13 calculates the distance between the traveling loci at both sides as a traveling locus width, and determines the number of lanes on the basis of the traveling locus width.

Figure 5:
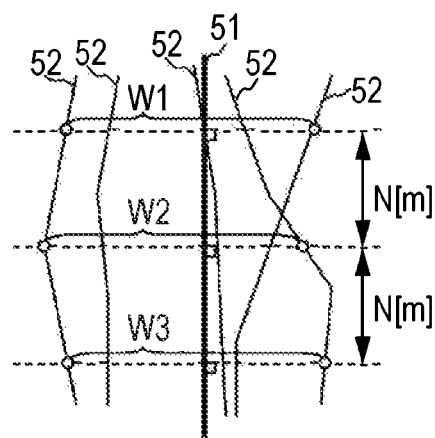
FIG. 5 is an illustration for describing an operation example when the road associated information setting unit sets the number of lanes.

FIG. 5 is an illustration for describing an operation example of the road associated information setting unit 13 in this case. In FIG. 5, reference sign 51 is a road shape line of a new road. As this road shape line 51, for example, a road link set by the new road setting unit 12 can be used. Alternatively, the moving locus may be displayed on the display screen of the server apparatus 103, and an operator may set the road shape line 51 on the basis of information manually input by operating the input device along the displayed moving locus. Reference sign 52 denotes a plurality of traveling loci, which are stored as movement history data relating to the new road, in the movement history storage unit 14. The traveling loci 52 are bent lines because of lane change, slight meandering, etc.

In this case, the road associated information setting unit 13 specifies traveling loci being the farthest from the road shape line 51 at the left and right of the road shape line 51 among the plurality of traveling loci 52, every interval of a distance N [m] (for example, 5 m) along the direction of the road shape line 51. Then, the distances between the left and right specified traveling loci are calculated as traveling locus widths W1, W2, W3, and so forth. Further, the road associated information setting unit 13 calculates the average value of the plurality of traveling locus widths W1, W2, W3, and so forth, and determines the average value as a traveling locus width W of the new road.

The traveling locus width W calculated as described above indicates a value close to the entire road width including a plurality of lanes of the new road. Hence, by dividing this traveling locus width W by a lane width L [m] (for example, 3 m) of each lane, the number of lanes can be determined. The traveling locus width W may include an error. Therefore, the number of lanes may be determined with an expression as follows by using a predetermined error adjustment value M [m] (for example, 5 m).

Number of lanes=(traveling locus width $W$−error adjustment value $M$)/lane width $L$ Also, the road associated information setting unit 13 sets pedestrian road information being a road attribute of the new road, as a piece of the road associated information. To be specific, the road associated information setting unit 13 classifies a plurality of moving loci relating to the same new road set by the new road setting unit 12 into moving loci (traveling loci) of vehicles and moving loci of pedestrians on the basis of the moving loci and moving speeds indicated by the movement history data stored in the movement history storage unit 14. Then, if the number of the moving loci of the pedestrians is larger by a predetermined ratio or higher than the number of the moving loci of the vehicles, and if the average value of the moving speeds of the vehicles is a predetermined value or lower, the road associated information setting unit 13 sets the pedestrian road information as a road attribute of the new road.

In this case, the classification between the moving locus of a vehicle and the moving locus of a pedestrian can be executed as follows. That is, in the entire section of a moving locus, if the length of a section with a moving speed of X3 [km/h] (for example, 10 km/h) or lower is Y3% (for example, 80%) or higher of the length of the entire section, and if the direction indicated by the moving locus markedly varies, the moving locus is classified as the moving locus of a pedestrian. In contrast, if this condition is not satisfied, the moving locus is classified as the moving locus of a vehicle.

If the number of the moving loci of the pedestrians classified as described above is larger by a predetermined ratio or higher (for example, ten times or more) than the number of the moving loci of the vehicles, and if the average value of the moving speeds of the vehicles is a predetermined value or lower, the road associated information setting unit 13 sets the pedestrian road information as a road attribute of the new road. This determination criterion is provided because, even on a pedestrian road, a specific vehicle or a delivery vehicle may travel at a low speed. Also, a bicycle may freely travel even on a pedestrian road, and hence the threshold X3 [km/h] of the moving speed for the classification may be set at a relatively large value (for example, 20 km/h).

Also, the road associated information setting unit 13 sets tunnel information being a road attribute of the new road, as a piece of the road associated information. In this case, it is assumed that data of traveling loci of vehicles included in the movement history data stored in the movement history storage unit 14 includes data of a traveling locus based on an autonomous navigation sensor and data of a traveling locus based on a GPS receiver. In this case, the road associated information setting unit 13 sets the tunnel information for a section in which the data of the traveling locus based on the autonomous navigation sensor is present but the data of the traveling locus based on the GPS receiver is not present, in the new road set by the new road setting unit 12. This tunnel information can be set as long as data of at least one traveling locus is present.

Also, the road associated information setting unit 13 sets time-period regulation information being a road attribute of the new road, as a piece of the road associated information. That is, the road associated information setting unit 13 judges that there is time-period regulation if a state without a traveling locus lasts for a predetermined period of time (for example, 30 minutes) or longer in the new road set by the new road setting unit 12, and sets the time-period regulation information as a road attribute of the new road.

Also, the road associated information setting unit 13 sets HOV lane information being a road attribute of the new road, as a piece of the road associated information. However, in this case, the movement history data stored in the movement history storage unit 14 is required to include data of the number of occupants in addition to the data of the traveling locus of the vehicle. The number of occupants of the vehicle can be detected as follows.

For example, weight sensors are provided at respective seats of the vehicle, and the weight sensors detect the number of occupants. Then, the detected number of occupants is transmitted from the navigation apparatus 101 to the server apparatus 103, as movement history data together with the data of the traveling locus, traveling speed, traveling time, etc. Means for detecting the number of occupants is not limited to the weight sensor. For example, the number of occupants may be detected by analyzing an image captured by an on-vehicle camera.

Alternatively, the number of occupants may be detected on the basis of movement history data generated by the smart phone 102 carried by an occupant. That is, if the moving locus, moving speed, and moving time are the same among plural pieces of movement history data stored in the movement history storage unit 14, the plural pieces of movement history data are highly possibly movement history data generated by a plurality of smart phones 102 carried by a plurality of occupants riding on a single vehicle together. Hence, if there are plural pieces of the same movement history data, the number of the plural pieces of movement history data can be detected as the minimum number of occupants.

The road associated information setting unit 13 classifies the plurality of traveling loci relating to the same new road set by the new road setting unit 12 into a plurality of lanes. Then, the road associated information setting unit 13 counts the number of the traveling loci with the number of occupants being two or more for each lane. If a lane is present in which the counted number is larger by a predetermined ratio or higher than the other lanes, the road associated information setting unit 13 sets the HOV lane information as a road attribute for the lane.

Matching between the traveling locus and the lane can be executed, for example, as follows. That is, the road associated information setting unit 13 has calculated the traveling locus width W and the number of lanes of the new road as described with reference to FIG. 5. By using this calculation result, the road associated information setting unit 13 further temporarily sets a lane with a lane width L [m] corresponding to the number of lanes at the new road. Then, the plurality of traveling loci are classified into the plurality of lanes by determining in which regions of the temporarily set lanes the plurality of traveling loci are included.

As described above in detail, with this embodiment, the road associated information of the new road is automatically set in the region where an existing road is not present in the map data on the basis of the movement history data relating to the plurality of moving bodies collected from the plurality of navigation apparatuses 101 and the plurality of smart phones 102 and stored in the movement history storage unit 14 of the server apparatus 103. Accordingly, a worker is no longer required to perform the on-site investigation or manually generate the road associated information. The troublesome work and time required for registration of the new road can be markedly decreased.

In the above-described embodiment, the example has been described, in which the new road is set first on the basis of the movement history data stored in the movement history storage unit 14, and then the road associated information to be applied to the road link of the set new road is determined and set. However, the present invention is not limited thereto. For example, the road associated information may be determined and set first on the basis of the movement history data stored in the movement history storage unit 14, and then the road link of the new road may be generated.

If the road link is generated after the road associated information is set, the road link can be generated while dividing the road link into a section applied with the road attributes, such as the tunnel information, tollgate information, pedestrian road information, and HOV lane information, and a section without the road attributes. Also, even when the number of lanes changes in the middle of the new road, the road link can be generated while the point at which the number of lanes changes serves as a border.

Also, in this embodiment, the example has been described, in which the server apparatus 103 collects the movement history data from both the navigation apparatus 101 and the smart phone 102. However, the data may be collected from one of the server apparatus 103 and the navigation apparatus 101. If the movement history data is collected only from the navigation apparatus 101, the pedestrian road information cannot be set as the road attribute. In contrast, if the movement history data is collected only from the smart phone 102, the tunnel information cannot be set as the road attribute.

The above-described embodiment merely provides a specific example for implementing the present invention. The technical scope of the invention should not be exclusively interpreted on the basis of the embodiment. That is, the present invention can be implemented in various forms without departing from the idea or major features of the invention.

It is therefore intended that the foregoing detailed description be regarded as illustrative rather than limiting, and that it be understood that it is the following claims, including all equivalents, that are intended to define the spirit and scope of this invention.

What is claimed is:
1. A server apparatus comprising a map data update device configured to update map data on the basis of movement history data of a moving body, the server apparatus comprising:
   a movement history recording unit configured to cause movement history data relating to at least one moving body to be stored in a movement history storage unit, wherein the movement history data includes data of a traveling locus and data of a traveling speed of a vehicle; and a road associated information setting unit configured to determine and set road associated information to be applied to a road link of a new road, on the basis of the movement history data stored in the movement history storage unit for a region where an existing road is not present on the map data;

wherein the road associated information setting unit is configured to specify a connection-source existing road and a connection-target existing road connected with the new road at both ends of the new road, and to determine and set a road type of the new road from among an expressway, a local road, and a ramp road as a piece of the road associated information, on the basis of road types set on the map data for the specified existing roads and traveling speeds of a plurality of vehicles indicated by movement history data relating to the new road.

2. A server apparatus for updating map data on the basis of movement history data of a moving body, the server apparatus configured to:

store movement history data relating to at least one moving body in a non-volatile memory, wherein the movement history data includes data of a traveling locus and data of a traveling speed of a vehicle; and determine and set road associated information to be applied to a road link of a new road, on the basis of the movement history data stored in the non-volatile memory for a region where an existing road is not present on the map data;

wherein the server apparatus is configured to specify a connection-source existing road and a connection-target existing road connected with the new road at both ends of the new road, and to determine and set a road type of the new road from among an expressway, a local road, and a ramp road as a piece of the road associated information, on the basis of road types set on the map data for the specified existing roads and traveling speeds of a plurality of vehicles indicated by movement history data relating to the new road.

3. The server apparatus comprising the map data update device according to claim 1, wherein the road associated information setting unit of the server apparatus is configured to specify traveling loci being the farthest from a road shape line generated for the new road, at both sides of the road shape line among a plurality of traveling loci indicated by movement history data relating to the new road, to calculate a distance between the specified traveling loci at both the sides as a traveling locus width, and to determine and set a number of lanes being a road attribute of the new road as a piece of the road associated information.

4. The server apparatus comprising the map data update device according to claim 3, wherein the movement history data further includes data of a number of occupants of the vehicle, and wherein the road associated information setting unit is configured to classify the plurality of traveling loci relating to the new road into a plurality of lanes, to count a number of traveling loci with the number of the occupants being two or more for each lane, and if a lane is present in which the counted number is larger by a predetermined ratio or higher than the other lanes, to set HOV lane information as a road attribute for the lane.

5. The server comprising the map data update device according to claim 1, wherein the movement history data further includes data of moving loci and data of moving speeds relating to vehicles and pedestrians, and wherein the road associated information setting unit is configured to classify a plurality of moving loci relating to the new road into moving loci of vehicles and moving loci of pedestrians, and if a number of the moving loci of the pedestrians is larger by a predetermined ratio or higher than a number of the moving loci of the vehicles and if an average value of moving speeds of the vehicles is a predetermined value or lower, to set pedestrian road information being a road attribute of the new road as a piece of the road associated information.

6. The server comprising the map data update device according to claim 1, wherein the traveling locus includes data of a traveling locus based on an autonomous navigation sensor and data of a traveling locus based on a GPS receiver, and wherein the road associated information setting unit is configured to set tunnel information being a road attribute of the new road, as a piece of the road associated information, for a section in which data of a traveling locus based on the autonomous navigation sensor is present but data of a traveling locus based on the GPS receiver is not present, in the new road set by the new road setting unit.

7. The server comprising the map data update device according to claim 1, wherein the movement history data further includes data of a traveling time of a vehicle, and wherein the road associated information setting unit is configured to set time-period regulation information being a road attribute of the new road, as a piece of the road associated information, if a state without a traveling locus lasts for a predetermined period of time or longer in the new road.

8. The server comprising the map data update device according to claim 1, wherein the movement history data further includes data of a traveling time of the vehicle, and wherein the road associated information setting unit is further configured to set tollgate information being a road attribute of the new road, as a piece of the road associated information, for a road section including a point at which traveling of the vehicle is stopped for several seconds, in the new road determined as the expressway or the ramp road.

* * * * *